United States Patent
Sohn et al.

(10) Patent No.: US 10,128,470 B2
(45) Date of Patent: Nov. 13, 2018

(54) RECHARGEABLE BATTERY

(71) Applicant: SAMSUNG SDI CO., LTD., Yongin-si, Gyeonggi-do (KR)

(72) Inventors: Ju-Hee Sohn, Yongin-si (KR); Jun-Won Suh, Yongin-si (KR); Jeong-Doo Yi, Yongin-si (KR); Ju-Hyeong Han, Yongin-si (KR); Hyun-Hwa Song, Yongin-si (KR); Seok-Hun Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 256 days.

(21) Appl. No.: 14/948,155

(22) Filed: Nov. 20, 2015

(65) Prior Publication Data
US 2016/0268557 A1 Sep. 15, 2016

(30) Foreign Application Priority Data
Mar. 13, 2015 (KR) .................. 10-2015-0035254

(51) Int. Cl.
*H01M 2/02* (2006.01)
*H01M 2/18* (2006.01)
(Continued)

(52) U.S. Cl.
CPC ......... *H01M 2/0275* (2013.01); *H01M 2/021* (2013.01); *H01M 2/026* (2013.01); *H01M 2/0212* (2013.01); *H01M 2/0287* (2013.01); *H01M 2/168* (2013.01); *H01M 2/1673* (2013.01); *H01M 2/18* (2013.01); *H01M 2/26* (2013.01); *H01M 4/70* (2013.01); *H01M 10/0436* (2013.01); *H01M 2/0217* (2013.01); *H01M 10/0585* (2013.01); *H01M 2220/30* (2013.01)

(58) Field of Classification Search
None
See application file for complete search history.

(56) References Cited

U.S. PATENT DOCUMENTS

| 6,294,288 B1 * | 9/2001 | Gross .................. H01M 2/1673 429/127 |
| 9,718,997 B2 * | 8/2017 | Cyman, Jr. ............ C09J 133/14 |
| 2014/0079979 A1 | 3/2014 | Kwon et al. |

FOREIGN PATENT DOCUMENTS

| EP | 2770555 A1 | 8/2014 |
| EP | 3024053 A1 | 5/2016 |

(Continued)

OTHER PUBLICATIONS

EPO Extended Search Report dated Jul. 15, 2016, for corresponding European Patent Application No. 16159760.4 (7 pages).

*Primary Examiner* — Tracy M Dove
(74) *Attorney, Agent, or Firm* — Lewis Roca Rothgerber Christie LLP

(57) ABSTRACT

A rechargeable battery includes: an electrode assembly formed by repeatedly stacking first and second electrodes while interposing a separator therebetween, the first and second electrodes each having an uncoated region and a coated region; and a case having a flexible property and accommodating the electrode assembly. The electrode assembly includes a fixing portion where the separator is attached and fixed to the uncoated regions of the first and second electrodes.

18 Claims, 4 Drawing Sheets

(51) Int. Cl.
    *H01M 4/70*         (2006.01)
    *H01M 10/04*       (2006.01)
    *H01M 2/16*         (2006.01)
    *H01M 2/26*         (2006.01)
    *H01M 10/0585*    (2010.01)

(56) References Cited

FOREIGN PATENT DOCUMENTS

| KR | 10-2012-0095039 A | 8/2012 |
| KR | 10-2013-0085202 A | 7/2013 |

\* cited by examiner

RECHARGEABLE BATTERY

CROSS-REFERENCE TO RELATED APPLICATION

This application claims priority to and the benefit of Korean Patent Application No. 10-2015-0035254, filed in the Korean Intellectual Property Office on Mar. 13, 2015, the entire content of which is incorporated herein by reference.

BACKGROUND

1. Field

The following description relates to a rechargeable battery, and more particularly, to a rechargeable battery having a flexible property.

2. Description of the Related Art

With advancement of technologies for mobile devices, a demand for rechargeable batteries as an energy source has been increasing. A rechargeable battery differs from a primary battery in that it can be repeatedly charged and discharged, while the latter is incapable of being recharged.

One of the important aspects in manufacturing rechargeable batteries is energy density. Particularly, rechargeable batteries used in small electronic devices are embedded in the electronic devices to be used as a power source.

In this case, a volume or capacity and a form factor of the power source are determined since a size of the electronic device is limited and is set (e.g., predetermined) in terms of a design specification. As such, according to a down-sizing trend of information technology (IT) devices, a size of the power source also has to become smaller.

However, consumers demand that the rechargeable battery should last longer and capacity should increase despite a reduced size. That is, a volumetric energy density should be increased. Accordingly, any unnecessary space in the rechargeable battery should be reduced to provide for a compact size. Furthermore, with the development of flexible electronic devices, the rechargeable battery should also have a flexible characteristic.

A pouch rechargeable battery (i.e., a battery in a pouch form) having a flexible characteristic has been developed. The pouch rechargeable battery includes: an electrode assembly formed by stacking a positive electrode, a separator, and a negative electrode to perform charging and discharging operations; a pouch in which the electrode assembly is accommodated; and electrode tabs through which the electrode assembly is drawn out of the pouch.

An electrolyte solution is provided in an empty space between the electrode assembly and the pouch, and a vacuum state is maintained inside the rechargeable battery to reduce or minimize an overall volume.

However, since the flexible rechargeable battery is exposed to repeated bending operations, loosely coupled parts may be broken when a bending stress is applied to the pouch rechargeable battery.

The above information disclosed in this Background section is only for enhancement of understanding of the background of the invention and therefore it may contain information that does not form the prior art that is already known in this country to a person of ordinary skill in the art.

SUMMARY

Accordingly, an aspect of an embodiment of the present invention is directed toward a flexible rechargeable battery that is not easily ruptured by repeated bending operations.

In addition, an aspect of an embodiment of the present invention is directed toward a flexible rechargeable battery with increased capacity.

A flexible rechargeable battery according to an exemplary embodiment of the present invention includes: an electrode assembly with repeatedly stacking first and second electrodes while interposing a separator therebetween, the first and second electrodes each having an uncoated region and a coated region; and a case having a flexible property and accommodating the electrode assembly. The electrode assembly includes a fixing portion where the separator is attached and fixed to the uncoated regions of the first and second electrodes.

The separator may include: a first portion corresponding to the coated regions; a second portion having a cutout portion corresponding to the uncoated region of the first electrode and exposing a corner of the uncoated region of the first electrode; and a third portion having a cutout portion corresponding to the uncoated region of the second electrode and exposing a corner of the uncoated region of the second electrode.

The corners exposed by the cutout portion of the second portion and the cutout portion of the third portion may neighbor each other.

The uncoated region of the first electrode and the second portion may be adhered and fixed by an adhesive, and the uncoated region of the second electrode and the third portion may be adhered and fixed by an adhesive.

The rechargeable battery may further include: a first electrode tab electrically coupled to the first electrode at the corner of the first electrode exposed by the cutout portion of the first portion; and a second electrode tab electrically coupled to the second electrode at the corner of the second electrode exposed by the cutout portion of the second portion.

The first and second electrode tabs may be drawn out from one end portion of the case and are disposed to be separated by a set or predetermined distance.

The rechargeable battery may further include a margin portion disposed between one end of the electrode assembly and an inner surface of the case and allowing a length of the electrode assembly to vary at a free end thereof.

The margin portion may be disposed opposite to the first and second electrode tabs.

The case may further include a first exterior member and a second exterior member that are disposed on opposite surfaces of the electrode assembly.

Each of the first and second electrodes is made of a polymer sheet.

When the fixing portion is formed in the uncoated regions, as in an embodiment of the present invention, a flexible rechargeable battery that is not easily ruptured by repeated bending operations can be provided.

In addition and according to an embodiment, the rechargeable battery with improved capacity in which the fixing portion is not formed in the coated regions can be provided.

DETAILED DESCRIPTION

Figure 1:
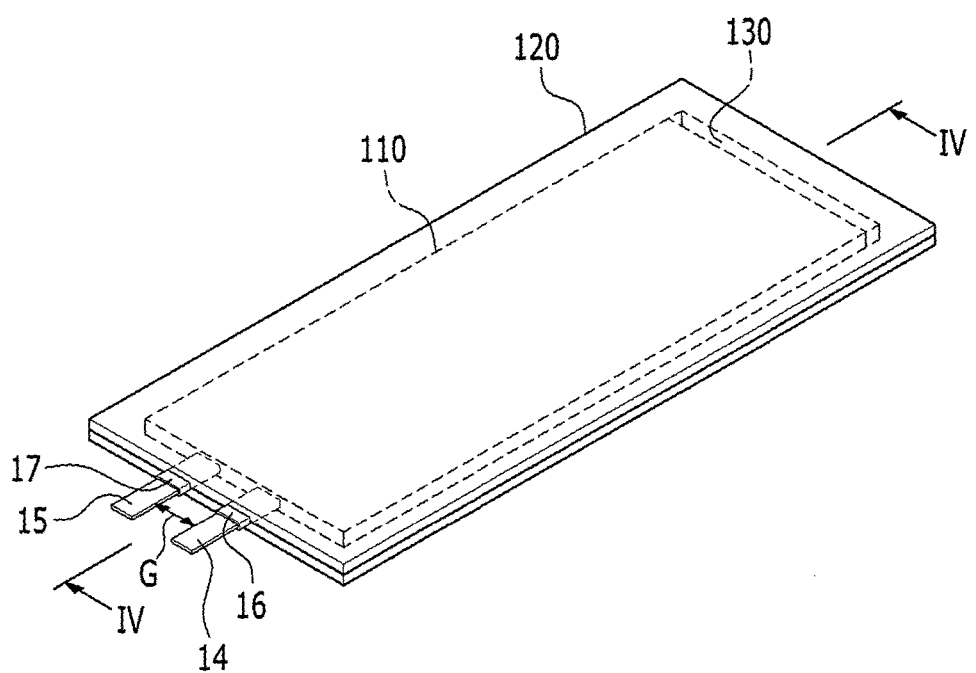
FIG. 1 is a perspective view of a rechargeable battery according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

Figure 2:
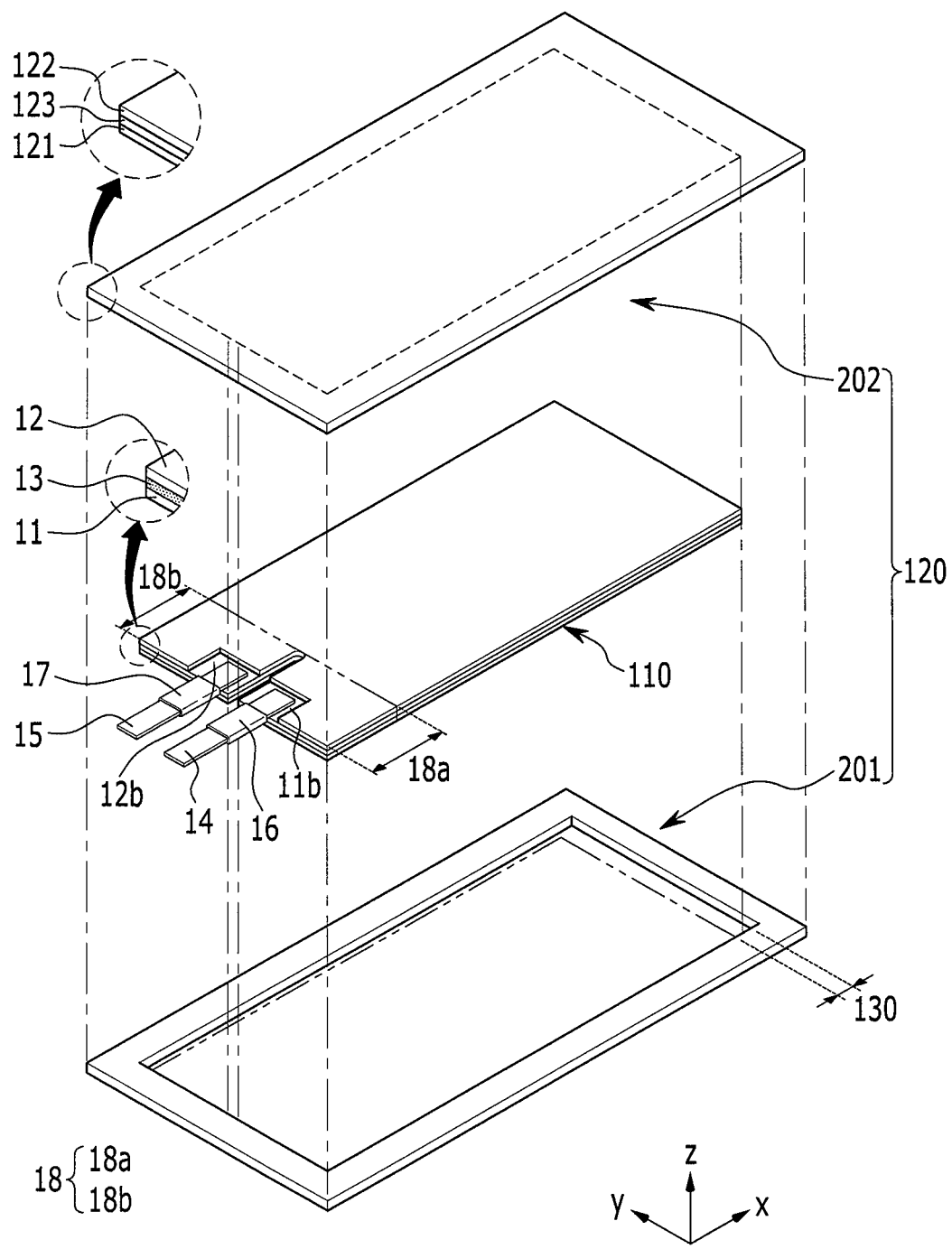
FIG. 2 is an exploded perspective view of the rechargeable battery of FIG. 1.

FIG. 1 is a perspective view of a rechargeable battery according to an exemplary embodiment of the present invention, and FIG. 2 is an exploded perspective view of the rechargeable battery of FIG. 1.

As shown in FIGS. 1 and 2, the rechargeable battery according to the exemplary embodiment of the present invention includes: an electrode assembly 110; a case in which the electrode assembly 110 is accommodated (hereinafter referred to as a pouch 120); and a margin portion 130 disposed between the electrode assembly 110 and an inner surface of the pouch 120 to allow a length of the bent electrode assembly 110 to vary.

Figure 3:
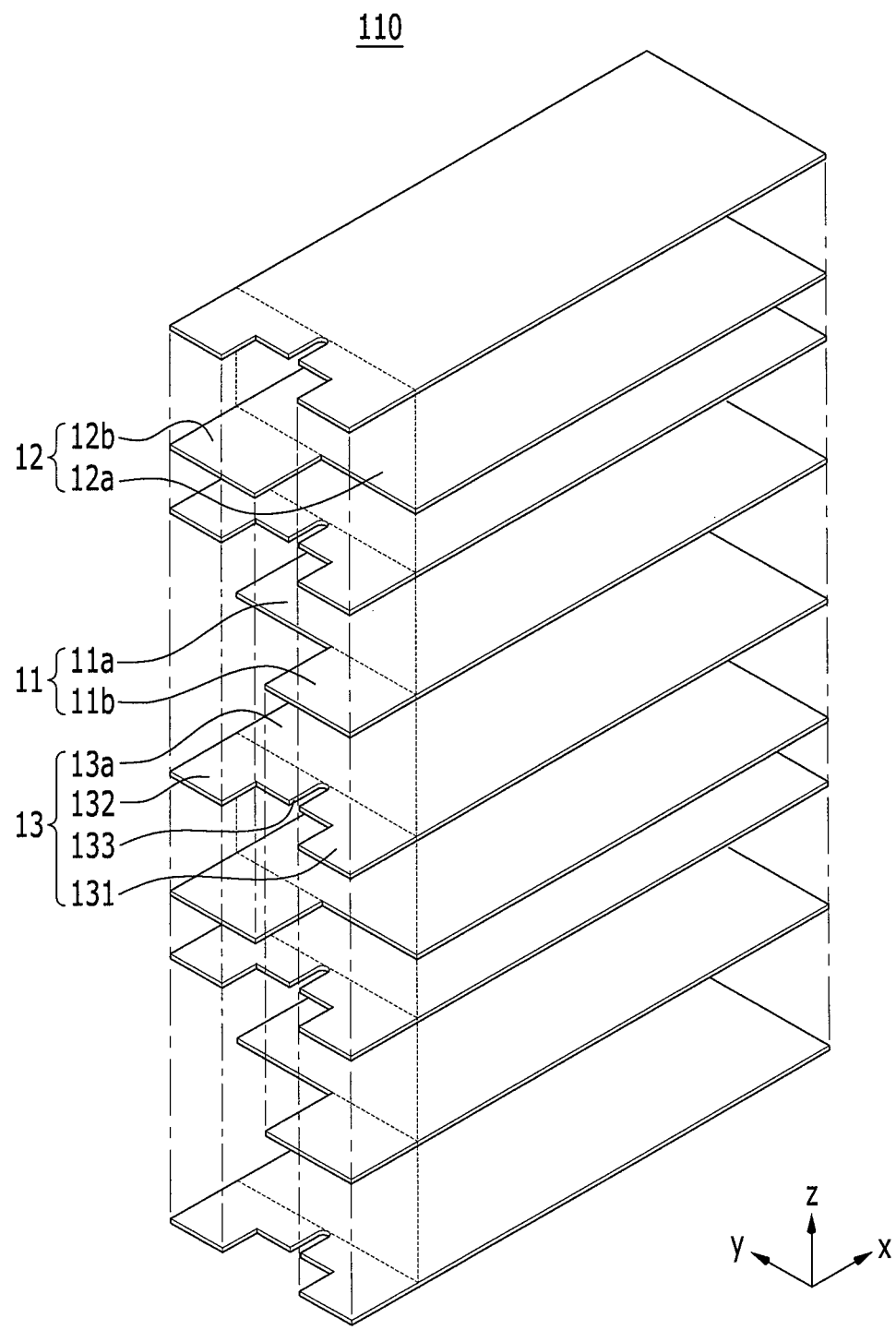
FIG. 3 is an exploded perspective view of an electrode assembly applicable to FIG. 2.

FIG. 3 is an exploded perspective view of the electrode assembly applicable to FIG. 2.

Referring to FIG. 2 and FIG. 3, the electrode assembly 110 is formed by stacking a first electrode 11 and a second electrode 12 while interposing a separator 13 therebetween. The separator 13 may be made of a polymer film through which lithium ions can pass.

The electrode assembly 110 further includes a first electrode tab 14 and a second electrode tab 15 that are respectively connected to the first electrode 11 and the second electrode 12. The first and second electrode tabs 14 and 15 are drawn out at one end portion of the pouch 120 to form a tab gap (G) therebetween.

The first electrode 11, the second electrode 12, and the separator 13 are fixed by a fixing portion (fixer) 18. The first electrode 11, the second electrode 12, and the separator 13 may be maintained such that they slip with respect to each other in portions where they are not fixed by the fixing portion 18.

The fixing portion 18 is formed by adhering an uncoated region 11b of the first electrode 11, the separator 13, and an uncoated region 12b of the second electrode 12 together by using an adhesive. For example, the fixing portion 18 may be formed by a repeated process, such as applying an adhesive to the separator 13 corresponding to the uncoated region 11b and adhering the uncoated region 11b of the first electrode 11 thereto, applying an adhesive to the uncoated region 11b and adhering the separator 13 thereto, applying an adhesive to the separator 13 corresponding to the uncoated region 12b and adhering the uncoated region 12b of the second electrode 12 thereto, and applying an adhesive to the uncoated region 12b and adhering the separator 13 thereto.

For this purpose, the separator 13 may include: a first portion 13a corresponding to the coated regions 11a and 12a of the first and second electrodes 11 and 12; a second portion 131 having a cutout portion corresponding to the uncoated region 11b of the first electrode 11 and exposing any one corner (e.g., an inner-side corner) of the uncoated region 11b of the first electrode 11; and a third portion 132 having a cutout portion corresponding to the uncoated region 12b of the second electrode 12 and exposing any one corner (e.g., an inner-side corner) of the uncoated region 12b of the second electrode 12. In this case, the second portion 131 and the third portion 132 may be divided by a cutout groove 133. Also, in the embodiment as shown, the corners exposed by the cutout portion of the second portion 131 and the cutout portion of the third portion 132 neighbor (or are adjacent to) each other.

Accordingly, the fixing portion 18 includes: a first fixing portion 18a in which the second portion 131 of the separator and the uncoated region 11b of the first electrode 11 are fixed by an adhesive; and a second fixing portion 18b in which the third portion 132 of the separator 13 and the uncoated region 12b of the second electrode 12 are fixed by an adhesive. In this case, the adhesive is applied to the uncoated region 11b of the first electrode 11 in the second portion 131, while being applied to the uncoated region 12b of the second electrode 12.

As shown in FIGS. 2 and 3, when the cutout groove 133 of the separator 13 is formed, the separator 13 is split into two parts at its center by the cutout groove 133, so an electrically stable insulating structure may be formed, but it is not limited thereto. For example, in one embodiment, the cutout groove 133 may not be formed (not shown). That is, a structure in which the cutout groove 133 is not formed such that the second and third portions 131 and 132 of the separator 13 are integrally formed may also be possible. As such, if the cutout groove is not formed between the second portion and the third portion, a portion where the cutout groove is formed can be used as an area to be adhered, so the fixing portion 18 may have a high coupling force.

The margin portion 130 is disposed opposite to the fixing portion 18. That is, the margin portion 130 allows a length of the electrode assembly 110, which is provided opposite to the fixing portion 18 and is curved, to vary in a length direction (x-axis direction) of the rechargeable battery and the electrode assembly 110.

In the current exemplary embodiment, the fixing portion 18 is disposed opposite to the margin portion 130 since it is provided in the uncoated regions 11b and 12b.

Meanwhile, as a distance between the fixing portion and the margin portion becomes shorter, an allowable variable length range of the electrode assembly may decrease. However, in the present invention, since the fixing portion is formed in the uncoated region, a decrease in the allowable variable length range may be reduced or minimized. That is, when the bending stress is applied to the rechargeable battery, the electrode assembly 110 is bent, and in this case, the first electrode 11, the second electrode 12, and the separator 13 slip while being fixed in the fixing portion 18, thereby causing the length at a free end to increase or decrease. Accordingly, the electrode assembly 110 and the rechargeable battery may be easily bent.

The first electrode 11 includes a coated region 11a where an active material is coated on a current collector made of a thin metal plate, and the uncoated region 11b that is formed as an exposed current collector because an active material is not coated thereon. For example, a current collector of the first electrode 11 and the first electrode tab 14 may be made of aluminum (Al).

The second electrode 12 includes a coated region 12a where an active material different from the active material of the first electrode 11 is coated on a current collector made of a thin metal plate, and the uncoated region 12b that is formed as an exposed current collector because an active material is not coated thereon. For example, a current collector of the second electrode 12 and the second electrode tab 15 may be made of copper (Cu).

While being stacked, the uncoated regions 11b and 12b of the first and second electrodes 11 and 12 are alternately arranged at opposite lateral sides in a width direction (y-axis direction). That is, in FIG. 3, the uncoated region 11b of the first electrode 11 is disposed at a right side, while the uncoated region 12b of the second electrode 12 is disposed at a left side.

In embodiments of the present invention, since the fixing portion is formed in the uncoated regions, the entire coated regions of the first and second electrodes may be used as an active region, thereby increasing capacity of the rechargeable battery.

Referring back to FIGS. 1 and 2, the first electrode tab 14 may be connected to the uncoated region 11b of the first electrode 11, the second electrode tab 15 may be connected to the uncoated region 12b of the second electrode 12, and they may be respectively connected by welding to the uncoated region 11b of the first electrode and the uncoated region 12b of the second electrode that are exposed by the cutout portion at respective parts of the separator 13. Accordingly, the first and second electrode tabs 14 and 15 form the tab gap (G) at one side of the pouch 120 outside thereof.

The pouch 120 has a flexible property and accommodates the electrode assembly 110, with its exterior part thermo-bonded to form the rechargeable battery. In this case, the first and second electrode tabs 14 and 15 are coated with insulating members 16 and 17, and are drawn out of the pouch 120 through bonded parts. That is, the insulating members 16 and 17 electrically insulate the first electrode tab 14 from the second electrode tab 15, and electrically insulate the first and second electrode tabs 14 and 15 from the pouch 120.

The pouch 120 may have a structure in which multiple sheets (including the margin portion 130) are stacked to enclose an exterior of the electrode assembly 110. For example, the pouch 120 includes a polymer sheet 121 that forms an inner side and performs insulating and thermo-bonding functions, a PET (polyethylene terephthalate) sheet that forms an exterior surface and performs a protecting function, a nylon sheet or a PET-nylon composite sheet 122 (for convenience, a "nylon sheet" will be exemplarily described), and a metal sheet 123 that provides mechanical strength. The metal sheet 123 is interposed between the polymer sheet 121 and the nylon sheet 122, and for example, may be formed as an aluminum sheet.

The pouch 120 includes a first exterior member 201 that accommodates the electrode assembly 110, and a second exterior member 202 that is thermo-bonded to the first exterior member 201 outside of the electrode assembly 110 while covering the electrode assembly 110.

The first and second exterior members 201 and 202 may each be formed to have the same structure including the polymer sheet 121, the nylon sheet 122, and the metal sheet 123 stacked between the polymer sheet 121 and the nylon sheet 122. Though not illustrated, the first and second exterior members may be sealed while interposing a gasket therebetween.

For example, the first exterior member 201 is formed to have a concave structure for accommodating the electrode assembly 110, and the second exterior member 202 is flatly formed to cover the electrode assembly 110 accommodated in the first exterior member 201. Though not illustrated, the second exterior member may be connected to the first exterior member.

Figure 4:
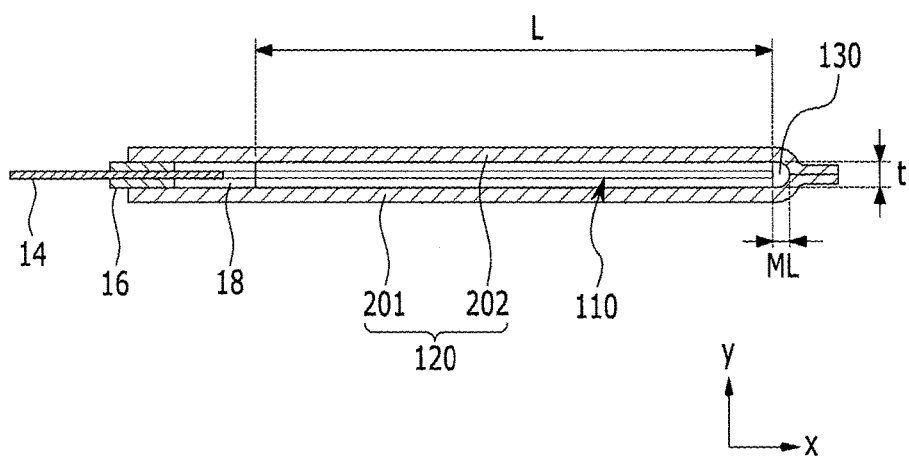
FIG. 4 is a cross-sectional view of FIG. 1 taken along the line IV-IV.

FIG. 4 is a cross-sectional view of FIG. 1 taken along the line IV-IV.

Referring to FIG. 4, in the rechargeable battery of one exemplary embodiment, the margin portion 130 is disposed opposite to the first and second electrode tabs 14 and 15, thereby allowing the length of the electrode assembly 110 to vary.

For example, the electrode assembly 110 has a characteristic length (L), a thickness (t), and an allowable curvature radius (R). The characteristic length (L) is a part of the entire length of the electrode assembly 110a in the x-axis direction from which a length of the fixing portion 18 is subtracted. That is, the characteristic length (L) is the part that may directly slip and be bent when a bending stress is applied to the electrode assembly 110.

The thickness (t) is a thickness set to the part of the electrode assembly 110 that corresponds to the characteristic length (L). That is, the thickness (t) is a thickness of the electrode assembly 110 that may directly slip and thus be bent when a bending stress is applied to the rechargeable battery. That is, the thickness (t) is a thickness of the rechargeable battery from which a thickness of the pouch 120 is excluded.

Since the bending stress increases the length and the increased length is allowed by the margin portion 130, the electrode assembly 110 and the rechargeable battery may be bent in accordance with the bending stress. Accordingly, in one embodiment when the rechargeable battery is bent, a rupture does not occur in the rechargeable battery and a short circuit is not generated.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present. As used herein, the terms "use," "using," and "used" may be considered synonymous with the terms "utilize," "utilizing," and "utilized," respectively.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

| Description of Symbols | |
| --- | --- |
| 11, 12: first, second electrode | 11a, 12a: coated region |
| 11b, 12b: uncoated region | 13: separator |
| 14, 15: first, second electrode tab | 16, 17: insulating member |
| 18: fixing portion | 110: electrode assembly |
| 120: case (pouch) | 121: polymer sheet |
| 122: nylon sheet | 123: metal sheet |
| 130: margin portion | 131: second portion of separator |
| 132: third portion of separator | |
| 201, 202: first, second exterior member | |

What is claimed is:

1. A rechargeable battery comprising:
    an electrode assembly comprising first and second electrodes stacked on each other in a first direction with a separator interposed therebetween, the first and second electrodes each having an uncoated region and a coated region, the uncoated regions of the first and second electrodes being offset from each other along the first direction, the separator comprising:
        a first portion overlapping the coated regions of the first and second electrodes;
        a second portion overlapping the uncoated region of the first electrode and having a cutout portion exposing a corner portion of the uncoated region of the first electrode, the second portion being attached and fixed to the uncoated region of the first electrode; and
        a third portion overlapping the uncoated region of the second electrode and having a cutout portion exposing a corner portion of the uncoated region of the second electrode, the third portion being attached and fixed to the uncoated region of the second electrode; and
    a case having a flexible property and accommodating the electrode assembly.

2. The rechargeable battery of claim 1, wherein the corner portions exposed by the cutout portion of the second portion and the cutout portion of the third portion neighbor each other.

3. The rechargeable battery of claim 1, wherein the uncoated region of the first electrode and the second portion are adhered and fixed by an adhesive, and the uncoated region of the second electrode and the third portion are adhered and fixed by an adhesive.

4. The rechargeable battery of claim 1, further comprising:
    a first electrode tab electrically coupled to the first electrode at the corner portion of the first electrode exposed by the cutout portion of the first portion; and
    a second electrode tab electrically coupled to the second electrode at the corner portion of the second electrode exposed by the cutout portion of the second portion.

5. The rechargeable battery of claim 4, wherein the first and second electrode tabs are drawn out from one end portion of the case and are disposed to be separated by a distance.

6. The rechargeable battery of claim 4, further comprising a margin portion disposed between one end of the electrode assembly and an inner surface of the case to allow a length of the electrode assembly to vary at a free end thereof.

7. The rechargeable battery of claim 6, wherein the margin portion is disposed opposite to the first and second electrode tabs.

8. The rechargeable battery of claim 1, wherein the case further comprises a first exterior member and a second exterior member that are disposed on opposite surfaces of the electrode assembly.

9. The rechargeable battery of claim 1, wherein each of the first and second electrodes is made of a polymer sheet.

10. A rechargeable battery comprising:
    an electrode assembly comprising a first electrode, a second electrode, and a separator between the first and second electrodes in a stacking direction, each of the first and second electrodes having an uncoated region and a coated region, the separator comprising:
        a first portion overlapping the coated regions of the first and second electrodes;
        a second portion overlapping the uncoated region of the first electrode and offset from the uncoated region of the second electrode along the stacking direction, the second portion having a cutout portion exposing a corner portion of the uncoated region of the first electrode, the second portion being attached and fixed to the uncoated region of the first electrode; and
        a third portion overlapping the uncoated region of the second electrode and offset from the uncoated region of the first electrode along the stacking direction, the third portion having a cutout portion exposing a corner portion of the uncoated region of the second electrode, the third portion being attached and fixed to the uncoated region of the second electrode; and
    a pouch accommodating the electrode assembly.

11. The rechargeable battery of claim 10, wherein the corner portions exposed by the cutout portion of the second portion and the cutout portion of the third portion are adjacent to each other.

12. The rechargeable battery of claim 10, wherein the uncoated region of the first electrode and the second portion are adhered and fixed by an adhesive, and the uncoated region of the second electrode and the third portion are adhered and fixed by an adhesive.

13. The rechargeable battery of claim 10, further comprising:
    a first electrode tab electrically coupled to the first electrode at the corner portion of the first electrode exposed by the cutout portion of the first portion; and
    a second electrode tab electrically coupled to the second electrode at the corner portion of the second electrode exposed by the cutout portion of the second portion.

14. The rechargeable battery of claim 13, further comprising a margin portion disposed between one end of the electrode assembly and an inner surface of the pouch to allow a length of the electrode assembly to vary at a free end thereof.

15. The rechargeable battery of claim 14, wherein the margin portion is disposed opposite to the first and second electrode tabs.

16. The rechargeable battery of claim 10, wherein the pouch further comprises a first exterior member and a second exterior member that are disposed on opposite surfaces of the electrode assembly.

17. The rechargeable battery of claim 10, wherein each of the first and second electrodes is made of a polymer sheet.

18. A method of forming a rechargeable battery, the method comprising:

providing an electrode assembly by repeatedly stacking first and second electrodes while interposing a separator therebetween, each of the first and second electrodes having an uncoated region and a coated region, the separator comprising a first portion overlapping the coated regions of the first and second electrodes, a second portion overlapping the uncoated region of the first electrode and offset from the uncoated region of the second electrode along a stacking direction, the second portion having a cutout portion exposing a corner portion of the uncoated region of the first electrode, and a third portion overlapping the uncoated region of the second electrode and offset from the uncoated region of the first electrode along the stacking direction, the third portion having a cutout portion exposing a corner portion of the uncoated region of the second electrode, the second and third portions being attached and fixed to the uncoated region of the first and second electrodes, respectively; and accommodating the electrode assembly in a pouch.

* * * * *